Patented July 31, 1951

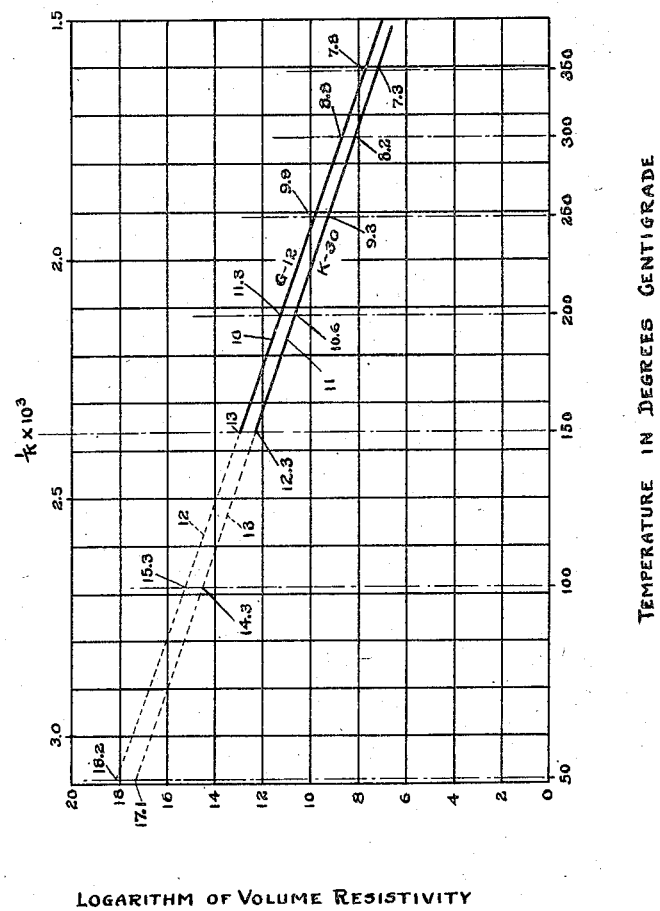

2,562,292

UNITED STATES PATENT OFFICE 2,562,292

GLASS COMPOSITION

Harold R. Black and Lawrence V. Gagin, Toledo, Ohio, assignors to Owens-Illinois Glass Company, a corporation of Ohio Application October 26, 1949, Serial No. 123,628

5 Claims. (Cl. 106—53)

Our invention is directed to the production of glass bulbs or tubes of the type used in the electrical field and in particular to the production of these from a composition of glass having certain desirable features heretofore only attainable with the high lead glass formulas common in this field.

The glass composition contemplated in this invention is a low lead content glass of low density and possessing characteristics which make it extremely valuable in the electrical field.

The primary object of this invention is the production of tubes having electrical resistivity values such as presently found in the usual electrical glasses. It is also an object of this invention to obtain these values without increasing the mass of the glass and with a considerable decrease in the cost of the batch composition.

A further object is the provision of a glass of low density to permit a greater production of parts per ton of glass worked but otherwise having the same characteristics as certain high density lead glasses.

Further objects of the invention will be apparent from the following specifications.

One feature of this invention consists in the elimination of the major portion of the most costly element of the batch composition, namely, lead oxide (PbO) to thereby reduce not only the basic cost of the glass but to also reduce the weight of each article made therefrom. As the lead content is reduced, the density of the glass is also reduced and this permits the production of a greater number of unit parts of like weight from each ton of glass than is possible with the usual high lead content batch compositions.

As one example of an article to be produced from this new glass composition, we refer to the present television image tubes where rather high resistivities are desirable at comparatively low operating temperatures, and this new composition will produce an article having such desirable features.

In producing this new composition, it is necessary to take cognizance of the effect upon the various operations in connection with making a complete television tube, such as the assembly of its various component parts and in particular to insure that such a new composition will not obsolete present assembly equipment. Therefore, it is necessary that the majority of the physical characteristics that exist in the presently produced high lead electrical glasses which would affect assembling conditions, be not disturbed to too great an extent, such as, the fiber softening point, annealing point, working point, and the thermal expansion coefficient. Actually these characteristics will only change slightly, say on the order of 1% to 4% with respect to those of the usual G-12 glass as defined below.

All of the above mentioned characteristics obtained in this new glass and G-12 are listed below.

| | New Glass | G-12 |
|---|---|---|
| Fiber Softening Point, °C | 654 | 630 |
| Annealing Point, °C | 442 | 433 |
| Thermal Expansion Coefficient (0–300 °C.)×10⁻⁷/° C | 90 | 89 |
| Working Point, °C | 1,023 | 986 |

The usual high lead content glass as mentioned herein is that generally known in the trade as G-12, and it has the following composition:

| | Per cent |
|---|---|
| Silica ($SiO_2$) | 56.7 |
| Alumina ($Al_2O_3$) and iron oxide ($Fe_2O_3$) | 1.4 |
| Sodium oxide ($Na_2O$) | 4.2 |
| Potassium oxide ($K_2O$) | 8.0 |
| Lead oxide (PbO) | 29.5 |
| Magnesium oxide (MgO) | 0.1 |
| Calcium oxide (CaO) | 0.1 |

The present practice in the making of lead glass for electrical purposes requires that large quantities of lead oxide (PbO) in some instances up to 75% of the glass, by weight, be used in order to obtain certain desirable electrical properties such as electrical resistivity. Although lead oxide is probably the most efficient added component capable of giving these desirable properties, it is now not only expensive, but difficult to obtain, and further it produces a high density glass with resultant low piece production per ton of melted glass. In order to offset the disadvantages of the heavy high lead oxide glass, this new composition is based upon a low lead content with the use of an additional element to support or accentuate the properties usually supplied by large quantities of lead oxide.

It is found that in combining lead oxide (PbO) with barium oxide (BaO), using a relatively small amount of the latter in place of the usual large quantities of lead oxide together with an increased use of silica that the physical characteristics of this new glass will approximately parallel the physical characteristics of the G-12 glass.

For example, in the normal operation of a television tube, its maximum operating temperature never exceeds 150° C., and for all practical purposes approximately the same electrical properties can be obtained with this new glass at this temperature as will prevail in tubes made of the usual high lead glasses and at the same temperature. Furthermore, such tubes at their average operating temperatures, when made from this new glass, display resistivities which, from the practical viewpoint, are the equivalent of those found in the usual high lead glasses used for such tubes and with considerably less mass of glass. Actually, tubes made from this new glass are approximately 12% lighter in weight than tubes made from the G-12 glass which is the glass most commonly used for making such tubes.

When speaking of low lead glass herein and the reduction of the lead content, it is suggested that this reduction is on the order of at least 54% less lead by weight which is replaced by BaO on a cost basis of approximately 59% less than the cost of lead.

From the G-12 formula, it will be noted that the (PbO) lead oxide content is on the order of 52% of the silica content ($SiO_2$) or percentagewise of the total glass weight, it forms approximately 30% thereof and results in a glass having a density of 3.05.

The composition of the new glass forming the basis of this invention is shown in the following table:

| | Percent |
|---|---|
| Silica ($SiO_2$) | 67.9 |
| Alumina ($Al_2O_3$) and iron oxide ($Fe_2O_3$) | 1.0 |
| Sodium oxide ($Na_2O$) | 4.3 |
| Potassium oxide ($K_2O$) | 10.6 |
| Calcium oxide (CaO) | 0.1 |
| Magnesium oxide (MgO) | 0.1 |
| Barium oxide (BaO) | 4.1 |
| Lead oxide (PbO) | 11.4 |
| Arsenic oxide ($As_2O_3$) | 0.1 |
| Lithium oxide ($Li_2O$) | 0.4 |

CaO and MgO as appearing in the formula do not form an essential part thereof as they are component impurities inherent in the raw materials.

Likewise $Li_2O$ is a component added to obtain greater fluidity in the glass, particularly for use in hand-forming operations and although it may also serve to permit high speed machine operation, it adds nothing to the main desirable features of the glass.

The percentage of each of the component materials forming a part of this new composition, excepting the inherent impurities, is rather critical and should not be varied to any great degree from that given, as variations in the percentage of these components of more than plus or minus 2%, by weight, will definitely adversely affect the obtaining of the desirable results.

For example, with the component silica forming less than 65.9% of the total glass weight; or the lead in excess of 13.4% of the total or the barium oxide in excess of 6.5% of the total weight the resultant glass from such a mixture will not have the desired attributes.

The salient point in this formulation as compared to G-12 is that an increased use is made of the less expensive components such as silica ($SiO_2$) and with a considerable decrease in the most costly component lead oxide (PbO). As a matter of fact, the reduction of approximately 54% in the use of PbO alone forms the greater portion of the total cost reduction and results in not only a reduction in the weight of the individual formed glass parts but also results in a glass having a density of 2.67 or approximately 12% less in density than G-12.

It will be noted that (PbO) lead oxide appears in this formula on a maximum weight basis of approximately 20.3% of the silica which is a considerable reduction when compared to the G-12 formula wherein lead is used on a basis of 52% of the silica. In the typical batch formula lead oxide (PbO) normally appears on a basis of 16.75% of the silica by weight. As previously mentioned, this formula is for a low lead content glass and actually there is a reduction over G-12 of approximately 54% in the use of lead.

This reduction in quantity use of the most costly component in the batch, results in a considerable reduction in cost per ton of batch materials. This cost reduction is on the order of 40% less than the cost per ton of batch for G-12 and this combined with the increase in pieces per ton obtained from this new formula, over that of G-12, gives a very desirable result.

This reduction in PbO does affect the properties of resistivity of this glass, but this change has been in a desirable direction, namely, the resistivity is such that at the average operating temperatures of television tubes the resistivity of this new glass approximately parallels or equals the resistivities of the G-12 glass.

Normally the resistivity would, with such a reduction in the lead oxide (PbO) content, decrease to such an extent, that for use in this particular field the resultant glass would present highly undesirable operating effects.

It is found that the usual operation of a tube occurs in the temperature range from 50° C. to 150° C.

The specifications set up in the commercial field for tubes of this type require that a certain degree of resistivity should be obtained at a temperature of approximately 350° C., and that this resistivity will increase as the temperature of the tube decreases. It will be found that as the temperature of the tube drops that the resistivity increases very rapidly and the lower the temperature the faster or the greater the increase in resistivity.

In the figure the volume resistivity characteristics of G-12 and this new glass are illustrated by lines 10 and 11 respectively and it will be noted that these lines for all practical purposes parallel each other. It will be noted that the logarithm of volume resistivity of G-12 at 350° C. is 7.8 while the logarithm of volume resistivity of the new glass at the same temperature is 7.3. Due to the fact that extremely high resistivities at such low temperatures, are extremely difficult to measure and even if measured, are unreliable, an approximation of the resistivities at these low temperatures are here obtained by extrapolation from the known or measured values of the higher temperature range, e. g., 150°/350° C.

Thus from the figure we find that the measurable values at given temperatures and given in logarithms of volume resistivity are as follows:

Table I

|  | G-12 | New Glass |
|---|---|---|
| 350° C | 7.8 | 7.3 |
| 300° C | 8.8 | 8.2 |
| 250° C | 9.9 | 9.3 |
| 200° C | 11.3 | 10.6 |
| 150° C | 13.0 | 12.3 |

Then by extending lines 10 and 11 as by the dotted line extensions 12 and 13, respectively, we find the extrapolated values from the measurable operating range of 150° C. down to 50° C. to be as follows:

Table II

|  | G-12 | New Glass |
|---|---|---|
| 150° C | 13.0 | 12.3 |
| 100° C | 15.3 | 14.3 |
| 50° C | 18.2 | 17.1 |

From these tables it will be noted that although the volume resistivity between 350° C. and 50° C. grows considerably in both glasses the variation between these values for both glasses changes only slightly in this range. For example, at 350° C., the volume resistivity of G-12, although slightly different than the new glass at the same temperature, is of such magnitude that there is no practical difference between them when compared to the unusually expensive G-12, for the end use of the glass. Thus there is produced through this new batch formulation, an inexpensive glass having all of the desirable characteristics of the expensive G-12 glass and in addition a further very desirable characteristic, not obtainable with G-12, namely, a low density glass permitting the production of more parts per ton of melted glass.

It is well known in the electrical field that the property of resistivity of the usual lead glasses increases and decreases approximately proportional to the increase and decrease of the lead content, but here we have a new glass wherein the lead content is decreased to a very marked degree and contrary to the normally expected results there is a resultant marked increase in the resistivity of the glass rather than the usual decrease in resistivity. This fact can be accounted for by the increased use of silica together with the support given to the small amount of lead oxide by the addition of barium oxide (BaO) in proper proportions to the batch and with such addition being of the order of 4.1% by weight of the total glass compared to a reduction of (PbO) lead oxide of approximately 18.1% by weight of the total glass.

From the preceding description, it should be quite apparent that a new glass results from this particular composition, and that this glass gives highly desirable characteristics of great advantage particularly in the cathode ray tube and television fields.

These advantages, when compared to the usual high lead glass, may be summarized as equal electrical properties at usual operating temperatures less weight per formed article, more formed articles per ton of glass melted, less costly batch composition and reduction in the weight and cost of the instrument in which these tubes will be used.

Modifications may be resorted to within the spirit and scope of our invention.

We claim:

1. A glass composition comprising the heat-reacted product of the following component ingredients by weight in substantially the following proportions:

|  | Per cent |
|---|---|
| Silica ($SiO_2$) | 67.9 |
| Alumina ($Al_2O_3$) and iron oxide ($Fe_2O_3$) | 1.0 |
| Sodium oxide ($Na_2O$) | 4.3 |
| Potassium oxide ($K_2O$) | 10.6 |
| Barium oxide (BaO) | 4.1 |
| Lead oxide (PbO) | 11.4 |
| Arsenic oxide ($As_2O_3$) | 0.1 |
| Lithium oxide ($Li_2O$) | 0.4 |

2. A glass composition comprising the heat-reacted product of the following component ingredients within the following range of proportions by weight:

|  | Per cent |
|---|---|
| Silica ($SiO_2$) | 65.9 to 69.9 |
| Alumina ($Al_2O_3$) and iron oxide ($Fe_2O_3$) | .8 to 3.0 |
| Sodium oxide ($Na_2O$) | 2.3 to 6.3 |
| Potassium oxide ($K_2O$) | 8.6 to 12.6 |
| Barium oxide (BaO) | 2.1 to 6.1 |
| Lead oxide (PbO) | 9.4 to 13.4 |
| Arsenic oxide ($As_2O_3$) | 0.08 to 0.3 |
| Lithium oxide ($Li_2O$) | 0.2 to 0.6 |

3. A glass composition comprising the heat-reacted product of the following component ingredients within the following range of proportions by weight:

|  | Per cent |
|---|---|
| Silica ($SiO_2$) | 65.9 to 69.9 |
| Alumina ($Al_2O_3$) and iron oxide ($Fe_2O_3$) | .8 to 3.0 |
| Sodium oxide ($Na_2O$) | 2.3 to 6.3 |
| Potassium oxide ($K_2O$) | 8.6 to 12.6 |
| Barium oxide (BaO) and lead oxide (PbO) | 11.5 to 19.5 |
| Arsenic oxide ($As_2O_3$) | 0.08 to 0.3 |
| Lithium oxide ($Li_2O$) | 0.2 to 0.6 | the amount of barium oxide being not more than that of the lead oxide.

4. As an article of manufacture, an electrical bulb fabricated from a glass composition, in accordance with claim 2, wherein the component materials forming said composition, are utilized in amounts such as to render the volume electrical resistivities in the glass, throughout the temperature range from 50° C. to approximately 150° C., approximately equal to the volume electrical resistivities of a high lead glass at the same temperatures throughout said range.

5. As an article of manufacture, an electrical tube made of glass having the composition set forth in claim 2, with the barium oxide and lead oxide combined in an amount not to exceed 19.5% to render the volume electrical resistivities in the glass, throughout the temperature range from 50° C. to approximately 150° C., approximately equal to the volume electrical resistivities of a high lead glass at the same temperatures throughout the said range.

HAROLD R. BLACK.
LAWRENCE V. GAGIN.

No references cited.